United States Patent [19]

Berggren

[11] Patent Number: 5,002,720
[45] Date of Patent: Mar. 26, 1991

[54] ELECTRET ENABLED THERMAL NEUTRON FLUX DETECTION AND MEASUREMENT

[75] Inventor: Stephen R. Berggren, Alexandria, Va.

[73] Assignee: The United States of America as represented by the Secretary of the Air Force, Washington, D.C.

[21] Appl. No.: 374,129

[22] Filed: Jun. 30, 1989

[51] Int. Cl.$^5$ .................................................. G01T 3/00
[52] U.S. Cl. ...................................... 376/154; 376/155; 250/370.03; 250/370.05; 250/390.01
[58] Field of Search ............... 376/153, 154, 155; 250/390.01, 370.03, 370.05

[56] References Cited

U.S. PATENT DOCUMENTS

| | | | |
|---|---|---|---|
| 2,663,802 | 12/1953 | Ohmart | 259/83.3 |
| 3,160,567 | 12/1964 | Steinberg et al. | 250/370.03 |
| 3,588,505 | 6/1971 | Johnson, Jr. | 376/153 |
| 3,760,183 | 9/1973 | Neissel | 376/154 |
| 3,949,178 | 4/1976 | Hellstrom et al. | 179/111 |
| 3,976,888 | 8/1976 | Miller et al. | 250/500 |
| 4,227,086 | 10/1980 | Dreyfus et al. | 250/389 |
| 4,407,852 | 10/1983 | Sapieha et al. | 427/41 |
| 4,428,808 | 2/1981 | West | 264/22 |
| 4,641,037 | 2/1987 | Butler et al. | 250/370.05 |
| 4,779,000 | 10/1988 | Ing | 250/390.03 |
| 4,788,430 | 11/1988 | Gonthier | 250/380 |
| 4,800,272 | 1/1989 | Harley et al. | 250/253 |
| 4,804,514 | 2/1989 | Bartko et al. | 250/390.03 |
| 4,853,536 | 8/1989 | Dempsey et al. | 250/253 |
| 4,857,259 | 8/1989 | Bartko et al. | 376/154 |

Primary Examiner—Harvey E., Behrend
Attorney, Agent, or Firm—Gerald B. Hollins; Donald J. Singer

[57] ABSTRACT

An improved thermal neutron flux detector and measuring apparatus of the neutron induced transmutation type. The disclosed apparatus employs a plastic film electret and a fissionable material such as uranium-235 for generating energetic ion fission fragments-fragments which alter the electric potential of the electret in a measurable manner. Electret characteristics and fissionable material member fabrication are also disclosed along with uses of the instrument for dosimetry and other purposes.

1 Claim, 4 Drawing Sheets

ELECTRET ENABLED THERMAL NEUTRON FLUX DETECTION AND MEASUREMENT

RIGHTS OF THE GOVERNMENT

The invention described herein may be manufactured and used by or for the Government of the United States for all governmental purposes without the payment of any royalty.

BACKGROUND OF THE INVENTION

This invention relates to the field of thermal neutron flux detection and measuring apparatus.

An electret is a dielectric material that is possessed of a quasi-permanent electrostatic polarity —— a polarity in which the static electric potential at one surface is greater than at the other. This condition can be produced by the preferential orientation of dipolar molecules within the material, and by the trapping of electrons or ions near one surface of the material.

Electrodes, placed at the surfaces of an electret and temporarily shorted, will transfer electrons around the shorting circuit to exactly neutralize the electret's external field. Once this occurs, no signal is detectable from the undisturbed system. If, however, an event occurs which either reorients some of the trapped dipoles or frees a portion of the trapped charges, the electret field is no longer exactly neutralized and a detectable voltage difference will appear between the electrodes. The more effective the event is at destroying the electret field, the greater the observed voltage.

Electrets are currently used in several radiation detection arrangements. In one of these arrangements, the electrostatic field from the electret is used to replace the high voltage power supply in an ionization chamber. In another arrangement of this type, as reported by M. Ikiya and T. Imki in Health Physics Volume 39, page 797, November, 1980, an electret supported charge multiplication arrangement is disclosed. In another example of this type, as disclosed in the patent of S. Hellstom, U.S. Pat. No. 3,949,178, an electret which is maintained in a stable voltage condition through the use of radioactive material excitation is used in a microphone and in other devices. Electrets are also desirably used in dosimeters where their simplicity and the absence of electret displaced electronic apparatus is of significant advantage. In such dosimeter devices the electret is usually received in a gas chamber where ionizing radiation produces electron-ion pairs in the gas. These pairs are then separated by the electric field of the electret. The collection of electrons or ions on the electret surface, however, tends to depolarize such electrets and they must be maintained by recharging or by arrangements such as is disclosed in the Hellstrom patent above.

Other known electret dosimeter arrangements use the gross depolarization of an electret by direct flux interaction to accomplish radiation measurements. Such devices are suitable for large or megaroentgen radiation doses but are generally considered too insensitive for use as personal dosimeter instruments. In such dosimeter arrangements, the degree of electret discharge by the radiation interaction is measured by comparing the electric field strength at a fixed position above the electret to that observed before the irradiation event. Alternately, a thermally simulated discharge, wherein current flow between surface electrodes of the electret is measured during a slow heating sequence, may be used to measure the degree of electret discharge. The Patent of P. E. Homart, U.S. Pat. No. 2,663,802 describes a neutron detector in which reliance on this gross depolarization concept is used.

Electrets have also been used in electrostatic particle traps that are employed for radon daughter dosimetry purposes. In this arrangement the electret is used as an electrostatic precipitator so that dust particles bearing radon daughters are attracted to and entrapped on the electret charged surface. In such instruments, the electret provides dust collection of the electrostatic precipitate without requiring a high voltage power supply.

The patent art reveals the prior use of fissionable materials such as uranium in a variety of applications including the neutron stimulated generation of fission fragments. In such uses uranium is often formed into the configuration of a foil to enable its bombardment by thermal neutrons. Such bombardment can generate fission fragments that are employed for a variety of useful purposes, such as the acceleration of deuterium and tritium particles to generate higher energy neutrons, for example. One apparatus of this type is shown in the Patent of L. G. Miller et al, U.S. Pat. No. 3,976,888.

The actual fabrication of electret devices is, as is implied above, known in a number of variations in the art. One example of electret formation is moreover to be found in the Patent of S. W. Sapieha. U.S. Pat. No. 4,407,852.

Electrets therefore have found several uses in dosimetry and other forms of radiation detection, however, the use of electrets in sensitive neutron flux instruments and in the detection of individual radiation events appears not to have been practiced. It is notable in this regard that the absence of electrical charge in a neutron makes direct neutron detection somewhat difficult to accomplish. It is parenthetically notable, however, that a sufficiently energetic radiation event such as the interaction of a fission fragment with an electret material can be detected directly as a change in field strength at the surface of the electret.

As a result of the absence of more readily detected charge, therefore, the detection of neutrons is usually accomplished through recognition of one or more secondary effects of a neutron interaction rather than by direct detection of the neutron particle itself. The principal methods of neutron detection used in present day apparatus are therefore classifiable as detectors relying upon neutron induced transmutations with detectable products, neutron activation of target nuclei and elastic scattering of neutrons with detection of the recoil product.

Neutron-induced transmutations involve such reactions as neutron generation of alpha particles (n,alpha), as well as (n,gamma), (n,p), and (n,fission) detection arrangements. An example of the (n,alpba) type detector is the boron trifluoride gas chamber wherein boron-10 undergoes an (n,alpha) reaction when it absorbs a thermal neutron. This reaction has a cross-section of about 1000 barns and yields 2.78 million electron volts. For this type of neutron detector, gaseous boron trifluoride is placed in an ionization chamber where the resulting alpha particle is readily detected. A similar detector using the (n,p) reaction is found in the helium-3 gas chamber detector. In this detector helium-3 undergoes an (n,p) reaction with a cross section of 5,400 barns and an energy yield of 675 keV. The energy (divided between a tritium atom and a proton) ionizes krypton gas in a chamber to produce the detectable signal. Both the boron and helium gas chamber detectors provide good efficiency and sincerity but are sensitive to other forms of radiation, particularly gamma radiation.

The fission track dosimeter is an example of the (n,fission) reaction. In this instrument a detector material consisting of a layer of mica or special plastic is placed next to a layer of uranium enriched in uranium-235. Fission events in the uranium-235 drive fission fragments into the detector material producing damage tracks. After appropriate chemical treatment, these damage tracks become visible and may be counted under a microscope. The number of damage tracks is, of course, related to the total thermal neutron fluence. The track detector makes a practical personnel dosimeter but its readout requires costly and time-consuming chemical treatment and optical counting.

Neutron detection by activation differs from transmutation detection in that the activation product has a reasonably long half-life before producing detectable products while transmutation produces detectable products almost immediately. The use of activation foils is a prime example of this detection method. In these detectors one of several elements, including indium, gold, silver, vanadium, and others, absorbs neutrons to produce radioactive isotopes. Foils of these materials are placed in a neutron flux and the resulting foil activity is then used to determine the flux intensity level. Since many of these materials have an effective neutron energy threshold for activation, the use of several different foils also yields neutron energy spectrum data. A drawback of activation analysis is, however, the high radiation fluences required for accurate results.

Neutron detectors using elastic scattering are almost exclusively proton recoil devices. When fast neutrons interact with a hydrogenous material, hydrogen nuclei are struck and absorb up to 100 percent of the neutron's energy. An ionization chamber filled with, for example, a hydrocarbon gas and lined with polyethylene can therefore measure an absorbed dose and also effectively rejects gamma energy. This type of detector can be fairly neutron-specific and sensitive but is not useful for detecting thermal neutrons.

For low-level thermal neutron fluxes, another detector, a semiconductor doped with boron-10, helium-3, or lithium-6 provides reasonable efficiency but at the cost of physical and electronic complexity, as well as, sensitivity to other forms of radiation.

Each of these types of neutron detectors therefore have certain advantages and disadvantages. Fission track dosimeters are small, simple and fairly sensitive but measure only total fluence and cannot be read without complex processing. Activation detectors require high flux levels; elastic scattering detectors are not useful for low energy thermal neutrons; and semiconductor detectors involve complex electronics. There is clearly, therefore, a need in the art for a low-level thermal neutron detector that is simple, compact, neutron-specific, and capable of real-time readout.

SUMMARY OF THE INVENTION

A thermal neutron-induced fission event in uranium-235 is capable of inducing a millivolt-sized variation in the field of a high charge density polyfluoroethylene propylene (FEP or Teflon ®) foil electret. (The name Teflon ® is a registered trademark of E. I. du Pont de Nemours and Company.) This electret generated signal is the basis of the herein described electret neutron detector.

It is therefore an object of the present invention to provide an improved arrangement for detecting and measuring thermal neutron flux.

It is another object of the invention to provide for the detection of thermal neutron flux using a neutron induced transmutation detection arrangement.

It is another object of the invention to provide a thermal neutron flux detection and measuring arrangement which employs an electret source of potential difference.

It is another object of the invention to provide a transmutation neutron detection arrangement in which the intermediate fissionable material may be disposed according to a plurality of alternate disposure arrangements.

It is another object of the invention to provide a thermal neutron detection arrangement that is capable of real-time readout.

It is another object of the invention to provide a thermal neutron detection arrangement which is significantly insensitive to other forms of radiation.

It is another object of the invention to provide a thermal neutron detector of the transmutation type which can employ a variety of electret and energetic ion generating materials.

Additional objects and features of the invention will be understood from the following description and the accompanying drawings.

These and other objects of the invention are achieved by a thermal neutron flux measuring apparatus which includes the combination of an electrically charged electret member having first and second facial surfaces of differing electrical potential, a pair of electrical charge responsive electrically conductive electrode members disposed adjacent the electret member facial surfaces, fission material means located in energetic ion coupled disposition with the electret member for generating electret member coupled energetic ion particles responsive to the incidence of the thermal neutron flux and electronic circuit means electrically coupled with the electrode members for measuring energetic ion induced changes in the electret member facial surfaces electrical potential.

DETAILED DESCRIPTION

Figure 1:
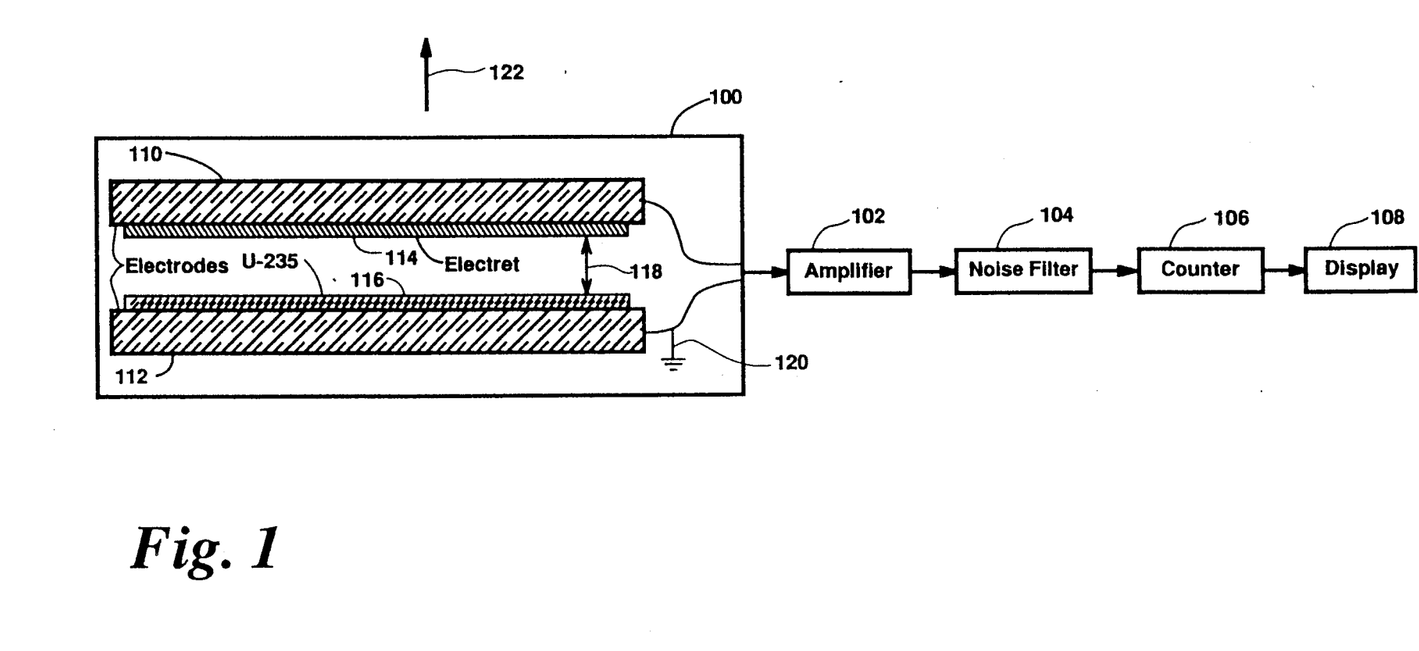
FIG. 1 shows a neutron detector apparatus that is made in accordance with the invention.

FIG. 1 in the drawings shows an apparatus according to the present invention that is useful for detecting and quantitatively measuring the intensity of thermal neutron flux. By way of background explanation thermal neutrons are neutrons that are in thermal equilibrium with their surrounding medium. Thermal neutrons are moreover those that have been slowed down by a moderator to an average speed of about 2200 meters per second at room temperature-from the much higher initial speeds possessed when they were expelled by fission. This velocity is similar to that of gas molecules at ordinary temperatures. Thermal neutrons are, of course, contrasted with fast neutrons and intermediate neutrons which are usually produced by fission events and which can be detected by other apparatus that is known in the art. Neutron flux is understood to be a measure of the intensity of neutron radiation and neutron flux density is the number of neutrons passing through one square centimeter of a given target in one second. Neutron flux may also be characterized mathematically as the product of n and v wherein n is the number of neutrons per cubic centimeter and v is the neutron velocity in centimeters per second.

The FIG. 1 thermal neutron flux detecting and measuring apparatus is comprised of a neutron detecting cell 100 which provides signal that is electrically coupled to a signal amplifier 102, a signal noise rejecting filter circuit 104, an event per unit time counting device 106, and a counter display device 108.

The neutron detecting cell 100 in FIG. 1 generally includes the pair of electrodes 110 and 112, a permanently or semipermanently charged electret member 114, and a predetermined quantity of fissionable material, material such as the enriched uranium-235 that is shown disposed in the layer 116. A small gap 118 is shown disposed between the lower surface of the electret 114 and the upper surface of the fissionable material 116 in FIG. 1. This gap 118 which is shown in exaggerated or enlarged form in FIG. 1 prevents spontaneous discharge of the electret 114. The lower most of the electrodes 112 in FIG. 1 is shown at 120 to be grounded; such connection is convenient for use in the amplifier 102.

In the FIG. 1 neutron detecting cell, the electret 114 may be comprised of a 25 micron thick film of polyfluoroethylene propylene or PFE Teflon ®. This electret foil is preferably charged to a potential in the range of nine thousand volts using a procedure such as that deVeloped by G. M. Sessler and J. E. West and described in the publication Applied Physics Letters volume 17, Number 12, 1970.

This charging produces a charge density in the foil that is in the range of $10^{-7}$ coulombs per square centimeter. The electrode 112 in the FIG. 1 neutron detecting cell is preferably made of copper and the electrode 110 is preferably made from stainless steel.

The sensitivity of a neutron detecting cell of the type shown in FIG. 1 is significantly controlled by the amount of fissionable material that can be placed within fission fragment track range of the electret 114. Using the preferred uranium-235 as an example, the range of a fission fragment in this uranium is about 5 microns. Because of this range, a uranium layer of greater thickness would contribute little to the detection of neutrons. Moreover in a thicker uranium layer the outer layer could even shield the inner more effective uranium from incident neutron flux.

The use of a large plated area is another way to increase the sensitivity of the FIG. 1 detection cell by increasing the available amount of uranium. A plated area would also, however, reduce the event signal strength because of the resulting greater capacitance. The electrical capacitance of the detecting cell 100 in FIG. 1 is, in fact, directly proportional to the area of the detector. Of course, the greater the uranium-235 enrichment in the layer 116 in FIG. 1, the greater the sensitivity of the cell. Some trade-off and optimization prospect is believed to exist between detector size and uranium plating thickness in order to achieve optimum sensitivity and detector cell performance in the FIG. 1 apparatus.

Energetic ions in the form of fission fragments are the contemplated form of coupling between the uranium-235 material in the layer 116 and the electret material 114 in FIG. 1. These fission fragments result from neutron flux that is received generally along the direction of the arrow 122 in FIG. 1. The detecting cell 100 is preferably operated under conditions of vacuum, that is with an internal pressure of 10 microns or below. The electrodes 110 and 112 in FIG. 1 preferably have a physical size of 3 centimeters diameter, are shaped in the form of a disk, and are separated by a gap 118 of 2 to 10 millimeters length.

The fission of uranium-235 by thermal neutrons produces fission fragments with energies of sixty to one hundred million electron volts. These fragments deposit their energy in fourteen to twenty micrometers of the preferred polyfluoroethylene propylene film of the electret 114. These fission fragments can be expected to produce electrical pulses from charges of approximately $10^{-16}$ coulombs that are induced on the electrodes. The fission fragments are positive ions with charges of $+16$ to $+20$ that heavily ionize any medium that they traverse.

Figure 3:
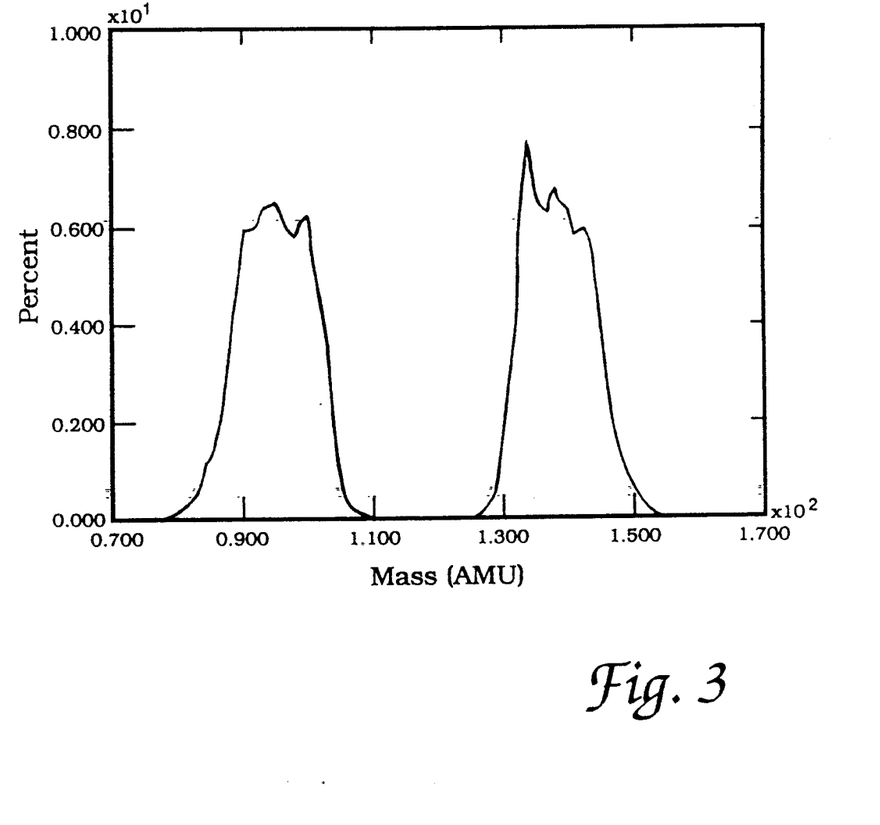
FIG. 3 shows the mass distributions resulting from thermal neuron fission in uranium-235.

Fission fragment generation is understood to involve the absorption of a neutron by an atom of uranium-235. The neutron absorption causes the atom to become unstable and to disassemble into two smaller nuclei with an accompanying energy release of about 207 million electron volts. About 167 million electron volts of this quantity appears as kinetic energy in the two nuclei with the remaining appearing as kinetic energy of emitted neutrons. The fission of uranium-235 by thermal neutrons produces a bimodal distribution of nuclear masses and nuclei as is shown in FIG. 3 of the drawings.

Additional details concerning the herein relied upon fission fragment generation and other theoretical aspects of the present disclosure are to be found in my academic dissertation, associated with the awarding of a Doctor of Philosophy academic degree, "The Pulse Response of Electrets to Energetic Ions". This distertation was submitted to the Department of the Air Force Air University, Air Force Institute of Technology, Wright-Patterson Air Force Base, Ohio in September of 1988. The dissertation is approved for public release with unlimited distribution and may, therefore, be viewed or copied by contact with the Air Force Institute of Technology. Copies are also available from University Microfilms Inc. and the Defense Technical Information Center (DTIC). The contents of this academic dissertation and the contents of my additional technical paper "The Interaction of Fission Fragments with Electron-Beam Charged Polyfluoroethylene Propylene", written in conjunction with my academic advisor Dr. George John of the Air Force Institute Technology (i.e. the Berggren and John Paper) are hereby incorporated by reference into the present document. This technical paper was submitted to The Institute Of Electrical and Electronic Engineers (IEEE) for publication in the journal "Transactions on Electrical Insulation" during the month of March 1989.

As explained on the second page of the Berggren and John technical paper a semi-emperical formula has been used to calculate the stopping power for various fission fragments in polyfluoroethylene propylene. A summary of these results is presented in FIG. 1 of the paper and additional details ar to be found in the E. C. Montenegro, S. A. Cruz and C. Vargas-Aburto 1982 reference identified at the end of the paper.

Generally speaking electrical signals in the range of 50 to 100 millivolts of amplitude may be expected from the detecting cell 100 in FIG. 1 when arranged according to the details recited herein. It is interesting to note that uncoated electret materials of the type indicated herein also emit a flash of light optical signal when struck by a fission fragment. Both the FIG. 1 used electrical signal and this optical signal are found to be transient phenomenon in that aging or annealing of the electret material eliminates the signals. The size and transent nature of the issued electrical signal may be explained with the aid of a charge-intersection model for the ion interaction, a model which is described in some detail in the Berggren and John technical paper. The optical signal may be observed with a photomultiplier tube or similar transducer and can also be used for neutron detection purposes.

Electron beam charging of the electret material 114 in FIG. 1 is preferred for the present use because of the more uniform charge distribution achieved by this charging method. Generally, beam energies between 10 and 50 kilovolts and beam current densities between $10^{-11}$ and $10^{-8}$ amps per square centimeter and charging times between 30 seconds and 2 hours are desirable. A modified electron microscope wherein the electron gun has an electron output that is reduced by about 2 orders of magnitude from the normal microscope value may in fact be used as an electret charging apparatus for the FIG. 1 electret. The X and y scanning capability vested in such a microscope is especially desirable for producing well controlled and reproducable electret spacial charge distributions. Other possible electret charging arrangements include breakdown charging, wherein a layer of polymer film and a thin layer of glass are placed between highly charged electrodes and Corona charging, wherein a highly charged pin is mounted above the polymer foil and induces charge unto the foil. An electrostatic voltmeter such as the Monroe model 440 isoprobe electrostatic voltmeter may be used to measure the surface charge density of electret materials. Additional details concerning the fabrication of desirable electret devices for use in the present invention are to be found in the above incorporated by reference academic dissertation, the published technical paper, and in the references cited therein.

In the FIG. 1 apparatus, the amplifier 102 preferably includes a low signal level charge sensitive preamplifier such as the model 142B amplifier made by E. G. and G. Ortec Corporation of 100 Midland Road, Oak Ridge Tenn. 37831-0895. Additional amplification following the Ortec Preamplifier may be desired but is noncritical in nature as compared with the low-level preamplifier. A Canberra model 2020 linear amplifier from Canberra Industries Inc. One State Street, Meriden Conn. 06450 may be, for example, used for the post preamplifier portion of the amplifier 102. An oscilliscope such as a Tektronix model 465 M from Tektronix Inc., Beaverton, Oreg., may be also connected to the output of preamplifier in the block 102 in order to view the signals originating in the detecting cell 100. An Ortec model 542 pulse stretcher may also be connected to the output of the Canberra linear amplifier in order to accomplish signal conditioning. With this arrangement of amplifiers for the block 102, charge events greater than $3 \times 10^{-16}$ coulombs may be detected.

The block 104 in FIG. 1 indicates the presence of signal filtering apparatus which serves to enhance the signal to noise distinction in the amplified signals received from the block 100 cell. Actually some degree of bandwidth limitation may be invested in the amplifiers of the block 102, however, additional filtering is preferably disposed in the block 104. Since mechanical vibration and resonance in the structure of the neutron detecting cell 100 in FIG. 1 is a major source of undesired signal or noise in the FIG. 1 apparatus, the use of filtering in the block 104 to remove the effects of this source of noise is especially desirable. An electrical wave filter of the attenuating type tuned to the mechanical frequencies of the detecting cell apparatus provides one arrangement for improving the signal to noise ratio of the FIG. 1 apparatus. Excepting for this mechanically induced noise, the signals in the output of the amplifiers in block 102 may be expected to have a frequency bandwidth covering the range of 1000 Hertz to 100 kilohertz.

The blocks 106 and 108 in FIG. 1 represent an electronic counter of events per unit time such as the number of counts per second or counts per minute together with a display of the counted events. The counter and display 106 and 108 may be embodied as a commercially fabricated electronic counter circuit such as are manufactured by Hewlett Packard Corporation of Palo Alto, Calif., and Tektronix Corporation and numerous other manufacturers. Counting in the range of 0.01 events per second to 10 events per second is to be expected in the block 106 counter.

The combination of the copper electrode 112 and the enriched uranium coating 116 on this electrode is preferably accomplished by a plating arrangement wherein uranium oxide is digested in nitric acid, evaporated to near dryness and redissolved in isopropyl alcohol. A small quantity of this solution may then be pipetted into a plating cell which consists of a glass tube cemented into the center of a copper disc and filled with isopropyl alcohol. A copper electrode suspended inside the cell at about 1 centimeter above the disc may be biased to several hundred volts in a positive potential direction in order to accomplish the plating operation. Plating is preferably accomplished at a cell current near two milliamperes over about 10 minutes of time. This process plates about $3 \times 10^{18}$ atoms of uranium-235 onto the disc. In a thermal neutron pile this fissionable material generates about 2.7 fissions per second. Although natural uranium and 30 percent enriched uranium may be used at 116 in FIG. 1, the preferred arrangement of the cell 100 includes plating with uranium that is enriched to 97 percent of uranium-235 content.

Figure 4:
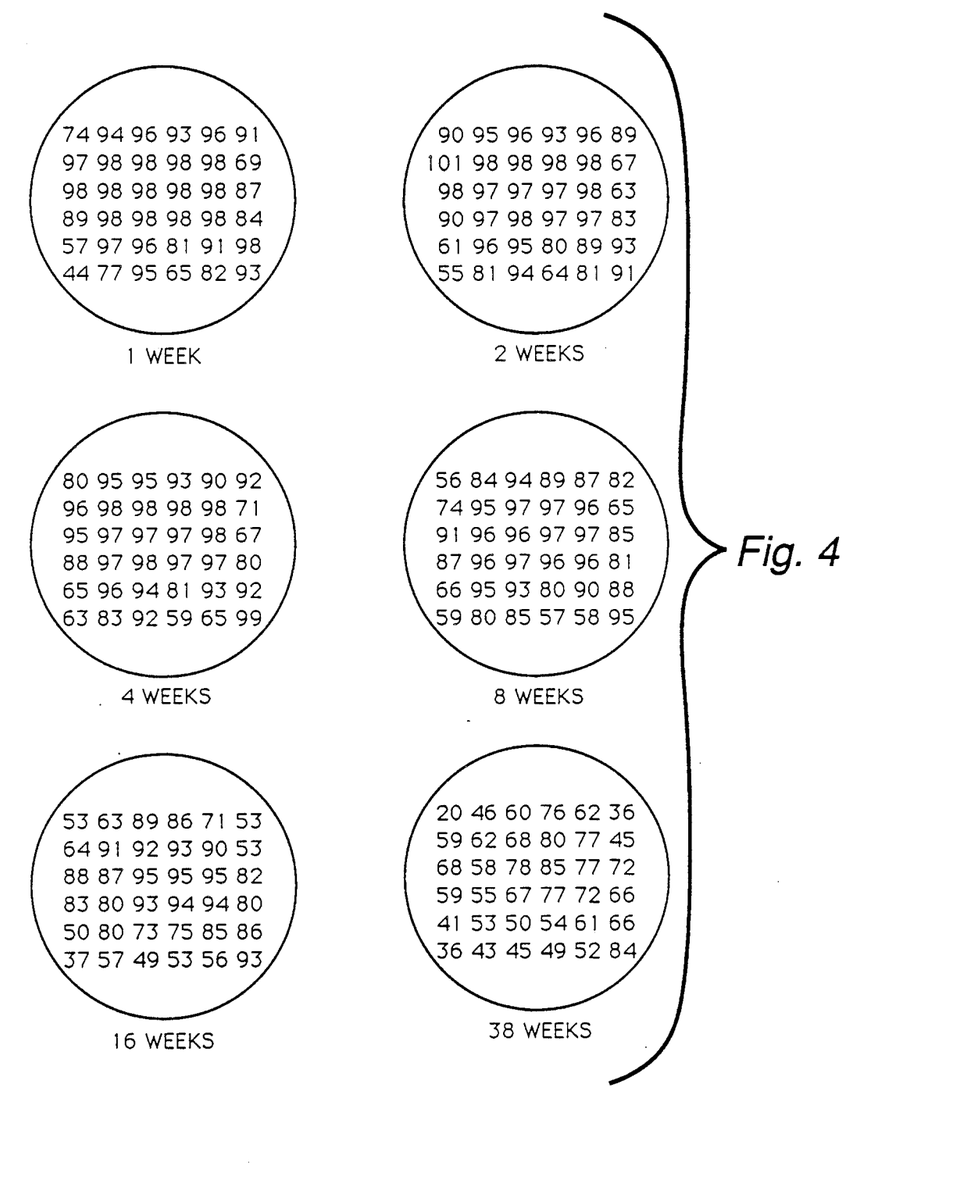
FIG. 4 shows the decay of electret charge as percentage of initial value for a corona charged Teflon ® electret film.

Electrets of the type described herein ar found to be semipermanent in their charge retention capability as is illustrated by the results shown in FIG. 4 of the drawings. The FIG. 4 data represents the charged decay pattern for a group of 25.4 micrometer polyfluoroethylene propylene samples that are corona charged to a charge density of $-1.5 \times 10^{-7}$ coulombs per square centimeter. The values shown in FIG. 4 represent a percentage of initial charge remaining after the indicated elapsed time and at 0.4 centimeter spacings across the sample. The occasional events of increasing charge with time are attributed to slight misalignment of the samples and a step charge gradiant existing at the point of interest. The edge-most changes in the charge retention ar believed to result from accidental handling of the FIG. 4 samples. Generally the charge retention is shown in FIG. 4 to be somewhat nonuniform. The FIG. 4 samples were stored in a humid environment.

Fission fragment signal occurrence tends to decay with time in the FIG. 1 apparatus. Over a period of days, for example, the number of pulses recorded above a background level tends to decrease. A decay time constant of about 10.5 hours appears to characterize this decaying. Such decay is part of a trend wherein the electrets no longer respond significantly to fission fragments after several days. In addition the initial count rate is low and tends to increase abruptly over the first few hours of electret usage.

Figure 2:
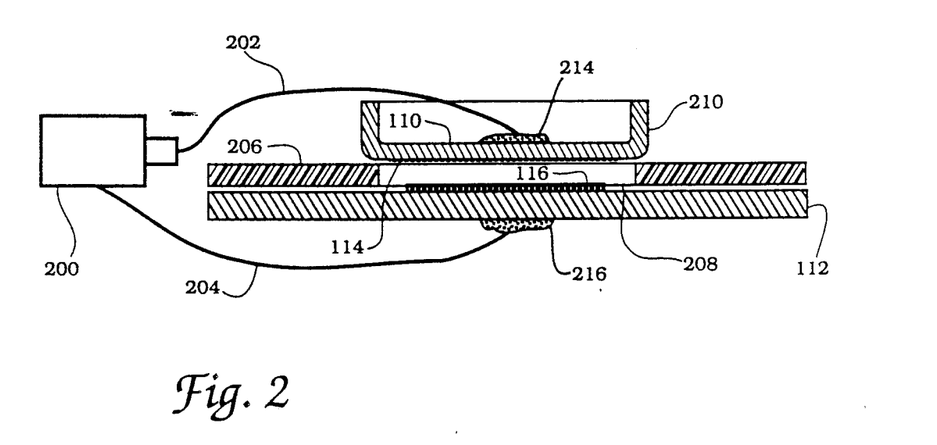
FIG. 2 shows additional details of the neutron flux detecting cell used in the FIG. 1 apparatus.

FIG. 2 in the drawings shows a more detailed arrangement of a detecting cell such as the cell 100 in FIG. 1 —— an arrangement which may be used in a working embodiment of the FIG. 1 apparatus. In the FIG. 2 detecting cell the element identifications used in FIG. 1 are repeated to the greatest degree possible with new identification numbers in the 200 series being employed for elements new in the FIG. 2 drawing. According to this arrangement therefore the metal electrodes are shown at 110 and 112 in FIG. 2, the electret film at 114, and the uranium or other fissionable material layer is indicated at 116 in FIG. 2.

Additionally shown in the FIG. 2 detecting cell is the circular spacer element 206 and the spacer element aperture 208. The spacer element 206 may also be fabricated from polyfluoroethylene propylene material. The thicknesses of the spacer element 206 is selected to achieve adequate separation between the electret and the electrode in the FIG. 2 embodiment of the detecting cell. The electrode carrying the electret 114 in FIG. 2, that is, the uppermost and ungrounded electrode 210, is provided with the flange which serves to allow convenient handling.

The electrical connector by which signals from the FIG. 2 cell may be conveyed to the amplifier circuits of the block 102 in FIG. 1 is illustrated at 200 in FIG. 2. This connector may be of the conventional BNC coaxial cable connector type or of some other easily connected and disconnected signal conveying type. Leads for communicating electrode signals to the connector 200 are indicated at 202 and 204 in FIG. 2; it is understood that the lead 204 is grounded by way of the mounting ears for the connector 200, which are not shown in FIG. 2 but are known in the art. The leads 202 and 204 may be soldered or brazed to the electrodes 110 and 112 as is indicated at 214 and 216. Such heat enabled attachment of these leads is preferably accomplished prior to assembly of the FIG. 2 cell to avoid heating the electret 114 and the uranium 116. Machine screws or other mechanical attachment arrangements may be used for the leads 202 and 204.

ALTERNATE ARRANGEMENTS

Two possible methods exist for placing fissionable material in close proximity to the electret material of the present invention. The arrangements shown in FIGS. 1 and 2 may be considered to be surface contact dispositions of the fissionable material in which the uranium-235 is placed in close physical adjacency to the electret 114. Volume doping of the electret material itself is an alternate possible disposition of the fissionable material and may, for example, be achieved by dissolving a uranium compound into the electret material itself. Such volume doping produces the most intimate possible contact between the two materials. A volume doping arrangement also enables a higher concentration of fissionable material and takes advantage of signal from both of the fission fragments illustrated in FIG. 3 of the drawings. Volume doping of the electret material requires the dissolving of boron, uranium or transuranic salts into the electret plastic film material during some portion of the fabrication step. Such intimate placement of the energetic particle generating material in the electret material also allows high fission fragment generating concentrations and thereby contributes to the detection of both FIG. 3 fission fragments and increased signal generating capability in the FIG. 1 and FIG. 2 detector cells.

Another volume doping arrangement involves the use of a boron salt as both the electret material and the fission fragment generating element in a detecting cell. Boron nitride, for example, is a dielectric material which appears to support induced space charge. A piece of charged boron nitride can therefore be expected to respond to thermal neutron flux with detectable surface electric currents which originate in the transmutation mechanism described herein.

The operating characteristics of the herein disclosed detector and measuring apparatus may be compared to those of the fission track etch dosimeter. The effect of neutron energy on track count is similar in these devices as are the flux calibration methods. The applications of the presently disclosed detector may therefore include personal dosimetry and environmental measurements and other applications commonly relegated to the fission track etch detector. Although the disclosed detector includes some electronic apparatus and is therefore somewhat larger than the fission track dosimeter it offers the notable advantage of providing direct readout in real time. The electronic portion of the present apparatus can of course be decreased in physical size from that of the disclosed commercial instruments by one skilled in the electronic circuit art.

The herein provided direct readout enables counting of a fission event as it occurs rather than following exposure, development, and microscopic observation of a dosimeter sample as in the fission tack etch device. This real-time capability enables use of the disclosed apparatus in the making of flux variance measurements, in high neutron radiation warnings, and in daily or even hourly neutron dose measurements.

A significant advantage of the disclosed detector also resides in its insensitivity to other forms of radiation. High intensity gamma radiation can of course depolarize the electret 114 of the present invention over a time period. Such depolarization is, however, the product of megarads of gamma radiation as in the case of direct interaction electret dosimeters. Gamma rays that produce pulses of the same size and time scale as seen for the herein employed fission fragment would, however, require a single very energetic gamma —— as might attend cosmic rays, for example. The interaction cross section of such Cosmic rays in plastic is desirably low, however. Additionally if interaction does occur the resulting energetic electron will deposit only a small part of its energy in the electret of the present invention. Alpha particles may produce a measurable response if they interact with the electret of the present invention. The uranium preferred for use in the present detector emits alpha particles of energy ranging between 4.1 and 4.6 mega electron volts. The resulting signal however is of much lower energy than the average fission fragment signal. As a result a major advantage of the presently disclosed detector is an extremely low background count rate even in a high gamma environment.

The detector of the present invention therefore measures neutron flux by directly counting the number of fission events in a known quantity of fissionable material using the electrical response of an electret to fission fragment interaction.

The invention therefore provides an improved arrangement for detecting and measuring thermal neutron flux through the combined use of fissionable material and an electret, a material having a semi permanent electrostatic charge.

I claim:

1. Solid state Thermal neutron flux measuring apparatus of increased flux sensitivity comprising the combination of:
   a uniformly charged polyfluoroethylene propylene film electret member of twenty five micron thickness and charge density of $10^{-7}$ coulombs per centimeter squared, said electret member having first and second surfaces of differing electrical potential;
   a pair of electret electrical charge responsive metallic electrode members disposed adjacent said film electret member facial surfaces in charge coupled signal collection relationship therewith;
   fission material means including uranium-235 fissionable material disposed in 60 to 100 million electron volt fission fragment track range of said electret member for generating electret member coupled fission fragment particles responsive to the intensity of incident thermal neutron flux thereon;
   electronic events per unit of time counting means electrically coupled with said metallic electrode signal collection members for indicating quantitatively the generation of said fission fragment particles by said thermal neutron flux;
   electronic amplifier means including noise filtering means disposed intermediate said electrode members and said electronic events per unit of time counting means for amplifying and enhancing the signal coupled therebetween;
   evacuated enclosure vessel means for maintaining said electret member, said signal collection electrodes, and said fission material means in an evacuated atmosphere.

* * * * *

UNITED STATES PATENT AND TRADEMARK OFFICE
CERTIFICATE OF CORRECTION

PATENT NO. : 5,002,720
DATED : March 26, 1991
INVENTOR(S) : Stephen R. Berggren

It is certified that error appears in the above-identified patent and that said Letters Patent is hereby corrected as shown below:

Col 1, line 37, "Health Physics" should be in quotation marks.

Col 2, line 14, after "applications" a dash should be inserted.

Col 2, line 57, "alpba" should be ---alpha---.

Col 2, line 60, "cross-section" should be ---cross section---.

Col 5, line 39, "deVeloped" should be ---developed---.

Col 7, line 1, "ar" should be ---are---.

Col 8, line 53, "ar" should be ---are---.

Col 8, line 67, "ar" should be ---are---.

Signed and Sealed this

Twenty-fourth Day of November, 1992

Attest:

DOUGLAS B. COMER

Attesting Officer

Acting Commissioner of Patents and Trademarks